(12) United States Patent
Uezono et al.

(10) Patent No.: US 12,294,075 B2
(45) Date of Patent: May 6, 2025

(54) METHOD FOR PRODUCING AN ELECTRODE SHEET

(71) Applicants: Prime Planet Energy & Solutions, Inc., Tokyo (JP); TOYOTA JIDOSHA KABUSHIKI KAISHA, Aichi-ken (JP)

(72) Inventors: Tomoyuki Uezono, Okazaki (JP); Sokichi Okubo, Okazaki (JP); Momoka Miyajima, Toyota (JP); Nagisa Shimasaki, Nagoya (JP); Masaki Watanabe, Seto (JP); Miyuki Matsuyama, Toyota (JP)

(73) Assignees: PRIME PLANET ENERGY & SOLUTIONS, INC., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 88 days.

(21) Appl. No.: 17/549,686

(22) Filed: Dec. 13, 2021

(65) Prior Publication Data

US 2022/0190309 A1 Jun. 16, 2022

(30) Foreign Application Priority Data

Dec. 14, 2020 (JP) ................................. 2020-206650

(51) Int. Cl.
*H01M 4/04* (2006.01)
*H01M 4/66* (2006.01)

(52) U.S. Cl.
CPC ......... *H01M 4/0435* (2013.01); *H01M 4/666* (2013.01); *H01M 4/667* (2013.01)

(58) Field of Classification Search
CPC ............. H01M 4/0404; H01M 4/0435; H01M 4/0471; H01M 4/13; H01M 4/139;
(Continued)

(56) References Cited

U.S. PATENT DOCUMENTS

| 2010/0075188 | A1* | 3/2010 | Fukui | .................. | H01M 8/1004 429/483 |
| 2016/0107211 | A1* | 4/2016 | Kagawa | .................... | B21B 1/40 72/203 |

(Continued)

FOREIGN PATENT DOCUMENTS

| CN | 111224060 A | 6/2020 |
| JP | H113701 A | 1/1999 |

(Continued)

*Primary Examiner* — Matthew T Martin
*Assistant Examiner* — Ankith R Sripathi
(74) *Attorney, Agent, or Firm* — HAUPTMAN HAM, LLP

(57) ABSTRACT

A method for producing an electrode sheet includes heating before pressing to heat the electrode sheet to soften or melt binder particles contained in an electrode mixture layer and roll-pressing the electrode sheet heated in the heating before pressing by use of first and second rolls. In the roll-pressing, the temperature of an outer peripheral surface of a first roll with which an outer surface of the electrode mixture layer of the electrode sheet contacts is set lower than the temperature of an outer peripheral surface of the second roll, and the electrode sheet is roll-pressed so that an adhesive strength of binder particles in the electrode mixture layer to the first roll is reduced lower than an adhesive strength of the binder particles to a current collecting foil.

9 Claims, 9 Drawing Sheets

(58) Field of Classification Search
CPC ........ H01M 4/66; H01M 4/666; H01M 4/667; H01M 10/0525
See application file for complete search history.

(56) References Cited

U.S. PATENT DOCUMENTS

| | | | |
|---|---|---|---|
| 2017/0256781 A1* | 9/2017 | Suzuki | H01M 4/139 |
| 2018/0057678 A1* | 3/2018 | Nagai | C08L 101/00 |
| 2020/0168889 A1 | 5/2020 | Tanaka | |
| 2021/0336242 A1* | 10/2021 | Kishimoto | H01M 4/0435 |
| 2022/0173371 A1* | 6/2022 | Fukunaga | H01M 4/0471 |
| 2022/0231269 A1* | 7/2022 | Chae | H01M 4/0445 |

FOREIGN PATENT DOCUMENTS

| | | |
|---|---|---|
| JP | 2002324549 A | 11/2002 |
| JP | 2004139846 A | 5/2004 |
| JP | 2010-287405 A | 12/2010 |
| JP | 202068113 A | 4/2020 |
| JP | 202087695 A | 6/2020 |
| JP | 202182396 A | 5/2021 |
| WO | WO-2021033521 A1 * | 2/2021 .......... H01M 4/0404 |

* cited by examiner

METHOD FOR PRODUCING AN ELECTRODE SHEET

CROSS-REFERENCE TO RELATED APPLICATIONS

This application is based upon and claims the benefit of priority to Japanese Patent Application No. 2020-206650 filed on Dec. 14, 2020, the entire contents of which are incorporated herein by reference.

BACKGROUND

Technical Field

The present disclosure relates to a method for producing an electrode sheet.

Related Art

As an electrode sheet, hereinafter, there has been known an electrode sheet including an electrode mixture layer on the surface of a current collecting foil. A known method for producing such an electrode sheet may include a method disclosed in for example Japanese unexamined patent application publication No. 2020-068113 (JP 2020-068113A).

Specifically, an apparatus provided with a roll A and a roll B which are rotated in opposite directions and configured to feed an electrode sheet by use of the roll B by passing the electrode sheet through a gap between the rolls A and B is used to put mixture powder containing electrode active material powder and binder powder without containing any solvent onto the surface of the current collecting foil. To be concrete, a potential difference is generated between the roll A and the current collecting foil fed by the roll B and, in such a state, the mixture powder is continuously supplied to the outer peripheral surface of the roll A, thereby generating a potential difference between the mixture powder supplied onto the outer peripheral surface of the roll A and the current collecting foil. The electrostatic force acting between the mixture powder and the current collecting foil moves the mixture powder from the outer peripheral surface of the roll A to the surface of the current collecting foil, so that the mixture powder is continuously put on the surface of the current collecting foil which is being fed by the roll B.

In a roll-pressing process, subsequently, the electrode sheet including an electrode mixture layer made of the mixture powder put on the surface of the current collecting foil is passed (roll-pressed) between a pair of hot rolls, i.e., the first and second rolls, which rotate in opposite directions. This operation softens or melts the binder contained in the electrode mixture layer and also bring the electrode mixture layer and the current collecting foil in pressure-contact relation, thereby producing an electrode sheet in which the electrode mixture layer including the electrode active material and the binder is adhered to the surface of the current collecting foil. The mixture powder is composed of a plurality of composite particles in which a plurality of binder particles bind to the surface of each active material particle. The electrode mixture layer before the roll-pressing process is an electrode mixture layer in which the plurality of composite particles are deposited on the surface of the current collecting foil.

SUMMARY

Technical Problems

According to the foregoing production method, when roll press is performed in the roll-pressing process, part of the softened or melted binder particles may stick to the outer peripheral surface of the first roll with which the electrode mixture layer contacts. Thus, when the electrode sheet passes between the first roll and the second roll, the electrode mixture layer separates from the outer peripheral surface of the first roll while the part of the binder particles contained in the electrode mixture layer remains sticking to the outer peripheral surface of the first roll. This separation may cause part of the electrode mixture layer to be detached (peeled off) from the surface of the current collecting foil together with the binder particles remaining stuck on the outer peripheral surface of the first roll and be transferred onto the outer peripheral surface of the first roll.

The present disclosure has been made to address the above problems and has a purpose to provide a method for producing an electrode sheet to prevent such a problem that part of an electrode mixture layer is detached (peeled off) from the surface of a current collecting foil and transferred onto the outer peripheral surface of a first roll.

Means of Solving the Problems

To achieve the above-mentioned purpose, one aspect of the resent disclosure provides a method for producing an electrode sheet including a current collecting foil having a surface on which an electrode mixture layer is provided, the method comprising: heating, before pressing, the electrode sheet including the current collecting foil and the electrode mixture layer formed of composite particles composed of active material particles and binder particles to soften or melt the binder particles contained in the electrode mixture layer, in which each of the binder particles has a smaller diameter than each of the active material particles so that a plurality of the binder particles bind to a surface of each of the active material particles; and roll-pressing the heated electrode sheet in the heating between a first roll and a second roll to compress the electrode mixture layer in a thickness direction, so that the active material particles are bonded to each other and the electrode mixture layer is bonded to the surface of the current collecting foil through the softened or melted binder particles, wherein the roll-pressing includes pressing the electrode sheet by setting a temperature of an outer peripheral surface of the first roll with which an outer surface of the electrode mixture layer of the electrode sheet contacts lower than a temperature of an outer peripheral surface of the second roll, so that an adhesive strength of the binder particles in the electrode mixture layer to the first roll is reduced lower than an adhesive strength to the current collecting foil.

In the foregoing production method, in the "heating before pressing", which represents heating to be performed prior to pressing and thus will be hereinafter also referred to as "pre-press heating", the electrode sheet including the current collecting foil and the electrode mixture layer is heated to soften or melt the binder particles contained in the electrode mixture layer. The electrode mixture layer under the pre-press heating is a layer made of a plurality of composite particles deposited on the surface of the current collecting foil without containing any solvent (liquid), that is, a layer composed of a plurality of composite particles. Further, the composite particles are particles configured such that a plurality of binder particles each having a smaller diameter than each active material particle bind to the surface of each active material particle without containing any solvent (liquid). To be specific, the composite particles are configured so that at least a plurality of the binder particles bind to the surface of each of the active material particles, and may be configured so that conductive particles, such as acetylene black, bind to the surface of each active material particles in addition to the binder particles.

In the foregoing production method, furthermore, in the roll-pressing, the electrode sheet heated in the pre-press heating is roll-pressed between the first roll and the second roll. Accordingly, while the electrode mixture layer is compressed in the thickness direction, the active material particles are bonded to each other and also the electrode mixture layer is bonded to the surface of the current collecting foil through the softened or melted binder particles. In the roll-pressing, the electrode sheet is roll-pressed by the first roll and the second roll while taking the form that the outer surface of the electrode mixture layer, i.e., the surface opposite the current collecting foil, contacts with the outer peripheral surface of the first roll.

To be specific, in the roll-pressing, the electrode sheet is roll-pressed between the first and second rolls under the condition that the temperature of the outer peripheral surface of the first roll with which the outer surface of the electrode mixture layer of the electrode sheet contacts is set lower than the temperature of the outer peripheral surface of the second roll. Thus, the adhesive strength (sticking strength) of the binder particles in the electrode mixture layer to the first roll is reduced lower than the adhesive strength (sticking strength) of the binder particles to the current collecting foil. Specifically, of the binder particles in the electrode mixture layer, the adhesive strength of the binder particles contacting with the first roll is made lower than the adhesive strength of the binder particles contacting with the current collecting foil.

With the above-described configuration, when the outer surface of the electrode mixture layer, i.e., the surface of the electrode mixture layer opposite the current collecting foil, is about to separate from the outer peripheral surface of the first roll after the roll-pressing, the binder particles in contact with the first roll can be easily separated from the outer peripheral surface of the first roll. Consequently, the foregoing production method can reduce a disadvantage that part of the electrode mixture layer is separated (peeled) together with the binder particles contacting with the outer peripheral surface of the first roll from the surface of the current collecting foil and transferred onto the outer peripheral surface of the electrode sheet roll.

The temperature of the outer peripheral surface of the first roll is set to a temperature at which the adhesive strength of the binder particles softened or melted in the pre-press heating decreases. For example, the temperature of the outer peripheral surface of the first roll may be set to a temperature lower than a softening temperature of the binder particles.

Further, in the method for producing an electrode sheet, after the electrode sheet is roll-pressed in the roll-pressing, the electrode sheet is fed by a fixed distance along the outer peripheral surface of the first roll while maintaining the outer surface of the electrode mixture layer in contact with the outer peripheral surface of the first roll, and then the electrode sheet is separated from the outer peripheral surface of the first roll.

In the foregoing production method, in the roll-pressing, the electrode sheet is roll-pressed by the first and second rolls and further the electrode sheet is fed by the fixed distance along the outer peripheral surface of the first roll while keeping the electrode mixture layer in contact with the outer peripheral surface of the first roll without being immediately separated from both the first and second rolls, but which is immediately separated from the second roll, and then the electrode sheet is separated from the outer peripheral surface of the first roll.

With the above configuration, the time required for the electrode mixture layer to start contacting with the first roll and then separate therefrom (i.e., a contact period) can be elongated. Thus, the adhesive strength of the binder particles contacting with the outer peripheral surface of the first roll, i.e., the sticking strength of the binder particles to the first roll, can be further reduced in a period before the electrode mixture layer separates from the outer peripheral surface of the first roll. Accordingly, when the electrode mixture layer is about to separate from the outer peripheral surface of the first roll, the binder particles contacting with the first roll are easily separated from the outer peripheral surface of the first roll. In other words, the binder particles are less likely to be transferred onto the outer peripheral surface of the first roll. Consequently, the foregoing production method can further reduce a disadvantage that part of the electrode mixture layer is likely to be separated, or peeled, from the surface of the current collecting foil and thus be transferred onto the outer peripheral surface of the first roll.

Still further, in any one of the foregoing methods for producing an electrode sheet, the heating before pressing includes, prior to roll-pressing the electrode sheet between the first roll and the second roll, feeding the electrode sheet by a fixed distance along the outer peripheral surface of the second roll while holding the electrode sheet in contact with the outer peripheral surface of the second roll having a temperature higher than the outer peripheral surface of the first roll, to soften or melt the binder particles contained in the electrode mixture layer.

In the foregoing production method, prior to the roll-pressing of the electrode sheet between the first and second rolls, that is, before the roll-pressing is performed, the pre-press heating is executed by feeding the electrode sheet by the fixed distance along the outer peripheral surface of the second roll while holding the electrode sheet in contact with the outer peripheral surface of the second roll having the higher temperature than the outer peripheral surface of the first roll, thereby softening or melting the binder particles contained in the electrode mixture layer.

In the foregoing production method, accordingly, the pre-press heating is performed by use of the second roll used in the roll-pressing. This method can thus reduce the cost for a production apparatus and hence the production cost as compared with a method needing an additional heating device for the pre-press heating separately from the second roll. The temperature of the outer peripheral surface of the second roll is set to a temperature at which the binder particles are softened or melted. For example, the temperature of the outer peripheral surface of the second roll may be set to a temperature higher than a softening temperature or a melting-point temperature.

DETAILED DESCRIPTION OF THE EXEMPLARY EMBODIMENTS

First Embodiment

A detailed description of a first embodiment of this disclosure will now be given referring to the accompanying drawings. In this first embodiment, the present disclosure is applied to production of a negative electrode sheet of a lithium ion secondary battery. In the first embodiment, specifically, a method for producing an electrode sheet is exemplified by a production method for a negative electrode sheet. The first embodiment describes producing a negative electrode sheet 100 (one example of an electrode sheet) including a current collecting foil 110 and a negative mixture layer 120 (one example of an electrode mixture layer) formed on the surface of the current collecting foil 110, i.e., on a first surface 110b (see FIG. 7).

Figure 1:
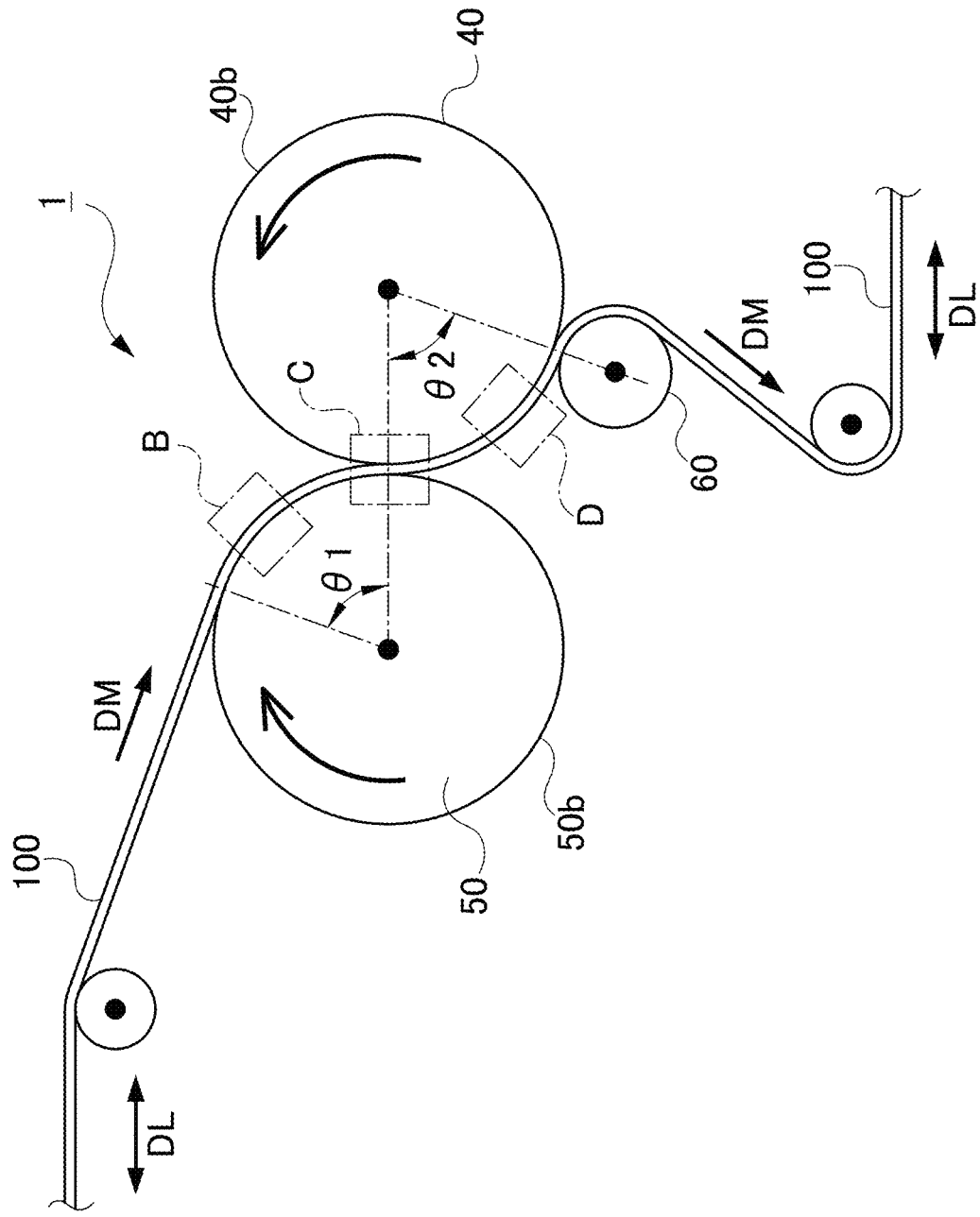
FIG. 1 is a schematic side view of an apparatus for producing an electrode sheet in a first embodiment.

An apparatus 1 for producing an electrode sheet (also referred to as an electrode sheet producing apparatus 1) will be described first. In the first embodiment, this electrode sheet producing apparatus 1 is used to produce the negative electrode sheet 100. FIG. 1 is a schematic side view of the electrode sheet producing apparatus 1 in the first embodiment. This electrode sheet producing apparatus 1 includes a first roll 40, a second roll 50, and a nip roll 60. The first roll 40 and second roll 50 are opposed and rotated as shown in FIG. 1.

The first roll 40 and the second roll 50 are arranged to be opposed in a horizontal direction, i.e., a lateral direction in FIG. 1. These first roll 40 and second roll 50 are placed facing each other with a gap or space therebetween. Further, the first roll 40 and the second roll 50 are configured to rotate in opposite directions to each other as indicated by arrows in FIG. 1. In the present embodiment, the diameter of each of those first roll 40 and second roll 50 is 250 mm. The nip roll 60 is located downstream from the gap between the facing portion of the first roll 40 and the facing portion of the second roll 50 in a feeding direction DM and is placed facing the first roll 40 with a gap therefrom (see FIG. 1).

In the electrode sheet producing apparatus 1 in the first embodiment, the negative electrode sheet 100 is fed at a feeding speed of 3 m/min in the feeding direction DM corresponding to a length direction DL of the negative electrode sheet 100. To be specific, as shown in FIG. 1, the negative electrode sheet 100 is fed from a more upstream side than the second roll 50 in the feeding direction DM, that is, from a left side of the second roll 50 in FIG. 1 toward the second roll 50.

Figure 2:
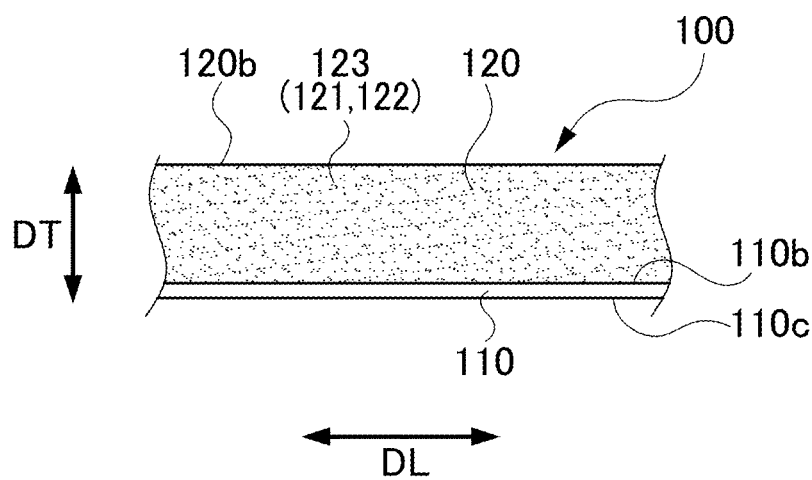
FIG. 2 is a side view of the electrode sheet under a pre-press heating process.
Figure 3:
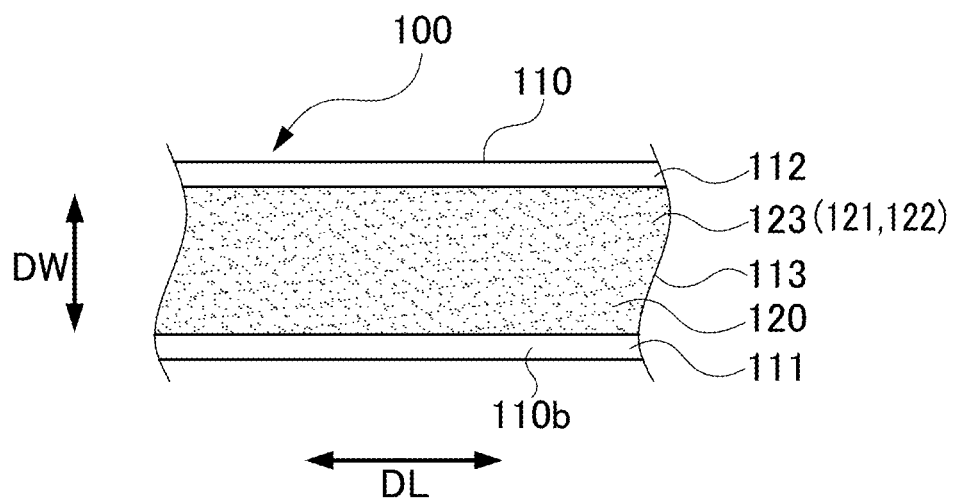
FIG. 3 is a plan view of the electrode sheet.

The negative mixture layer 120 of the negative electrode sheet 100 under feeding toward the second roll 50 in the feeding direction DM is a layer made of a plurality of composite particles 123 deposited on the first surface 110b of the current collecting foil 110 without containing any solvent (liquid), that is, a layer composed of the composite particles 123 (see FIG. 2). This negative mixture layer 120 is placed on the first surface 110b of a part of the current collecting foil 110 excluding both end portions in a width direction DW (i.e., a first end portion 111 and a second end portion 112), that is, on the surface of an intermediate portion 113 located between the first end portion 111 and the second end portion 112, as shown in FIG. 3. The negative electrode sheet 100 including the negative mixture layer 120 containing the plurality of composite particles 123 deposited on the first surface 110b of the current collecting foil 110 can be produced by a method for example disclosed in Japanese unexamined patent application publications Nos. 2020-068113 and 2021-082396.

The composite particles 123 are each made of an active material particle 121 having the surface to which a plurality of binder particles 122 bind, the binder particles 122 each having a smaller diameter than the active material particle 121. In the first embodiment, the active material particles 121 may include graphite particles (specifically, graphite particles coated with amorphous carbon) and the binder particles 122 may include PVDF particles. The binder particles 122 in the first embodiment have a softening temperature of 130° C. and a melting point of 160° C.

In the first embodiment, the plurality of composite particles 123 are made by mixing a plurality of active material particles 121 and a plurality of binder particles 122 at a mixture ratio by weight of 97.5:2.5. To be concrete, the active material particles 121 and the binder particles 122 are mixed at a mixture ratio by weight of 97.5:2.5 by use of a high-speed mixture (made by EARTHTECHNICA CO., LTD.) to produce the composite particles 123 in each of which the plurality of binder particles 122 bind to the surface of each active material particle 121. In the first embodiment, the current collecting foil 110 is a copper foil having a thickness of 8 μm.

The negative electrode sheet 100 fed toward the second roll 50 is fed so as to wind around an outer peripheral surface 50b of the second roll 50 at a winding, or warp, angle θ1, and then pass through the gap between the opposed first roll 40 and second roll 50. The negative electrode sheet 100 is further fed so as to wind around an outer peripheral surface 40b of the first roll 40 at a winding, or wrap, angle θ2, and then fed so as to wind around the nip roll 60. Thereafter, the negative electrode sheet 100 is fed downstream from the nip roll 60 in the feeding direction DM (see FIG. 1). In the first embodiment, the above winding angles θ1 and θ2 are equally set to 70° (θ1=θ2=70°).

In the first embodiment, by the way, the negative electrode sheet 100 is fed in the form of winding around the outer peripheral surface 50b of the second roll 50 at the winding angle θ1. Thus, prior to passing through the gap between the facing portions of the first roll 40 and second roll 50 spaced facing each other, the negative electrode sheet 100 is moved forward only by a fixed distance D1 along the outer peripheral surface 50b of the second roll 50 while the electrode sheet 100 is held in contact with the outer peripheral surface 50b of the second roll 50. In the first embodiment, the distance D1 is 153 mm, which is calculated as follows:

$$D1 = \text{Diameter of the second roll } 50 \times \pi \times (\theta 1/360°) = 250 \text{ mm} \times 3.14 \times (70/360).$$

In the first embodiment, furthermore, the temperature of the outer peripheral surface 50b of the second roll 50 is set to a temperature at which the binder particles 122 are softened or melted. To be concrete, the temperature of the outer peripheral surface 50b of the second roll 50 is set to 200° C., higher than the melting point (160° C.) of the binder particles 122. Thus, prior to passing through the gap between the facing portions of the first roll 40 and second roll 50, the negative electrode sheet 100 is heated when being fed by the fixed distance D1 along the outer peripheral surface 50b of the second roll 50 while remaining contact with the outer peripheral surface 50b of the second roll 50. Accordingly, the binder particles 122 contained in the negative mixture layer 120 are softened or melted. This process corresponds to a pre-press heating process (one example of the heating before pressing in the present disclosure), which will be described later.

Figure 4:
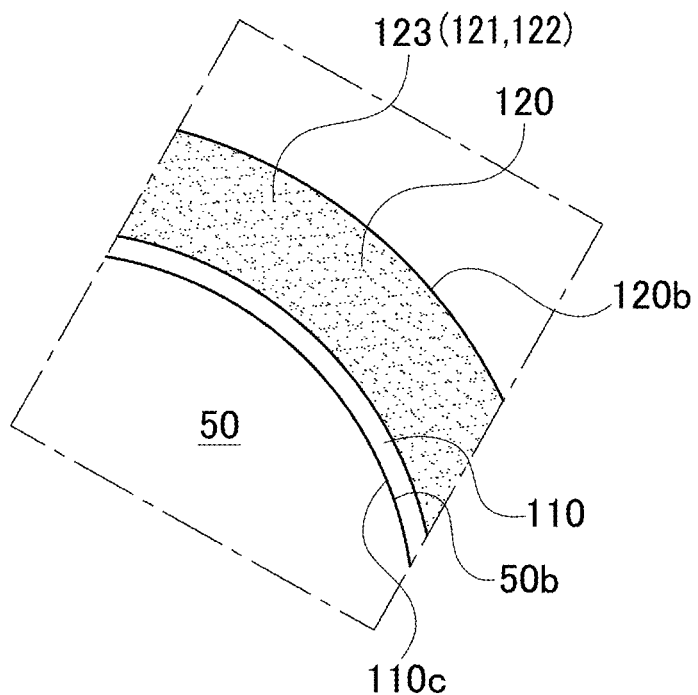
FIG. 4 is an enlarged view of a section B in FIG. 1.

In the first embodiment, the negative electrode sheet 100 is fed along the outer peripheral surface 50b of the second roll 50 so that a second surface 110c of the current collecting foil 110 contacts with the outer peripheral surface 50b of the second roll 50 (see FIG. 4) without making an outer surface 120b of the negative mixture layer 120, i.e., the surface opposite the current collecting foil 110, contact with the outer peripheral surface 50b of the second roll 50. The negative mixture layer 120 is thus heated by the second roll 50 through the current collecting foil 110. FIG. 4 is an enlarged view of a section B in FIG. 1. In the first embodiment, moreover, the temperature of the outer peripheral surface 40b of the first roll 40 is set to 80° C., lower than the softening temperature (130° C.) of the binder particles 122.

Figure 5:
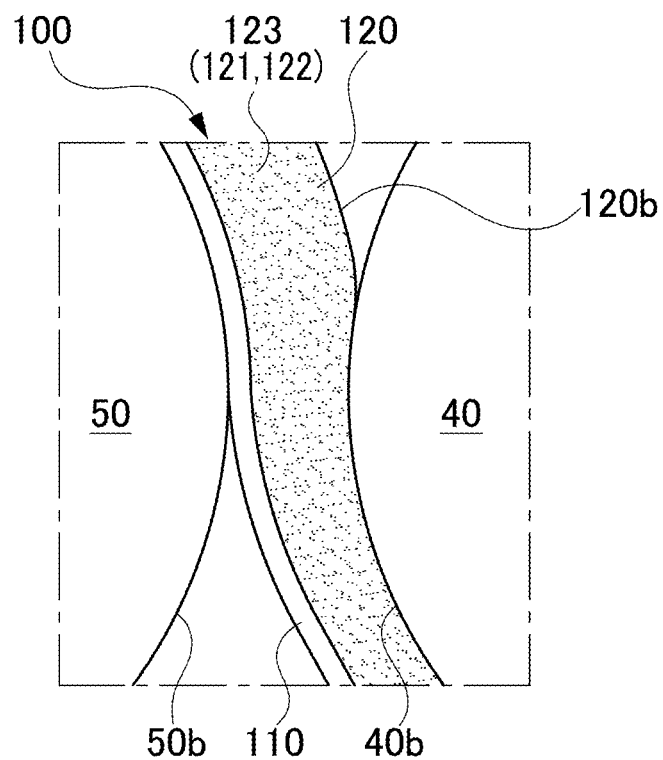
FIG. 5 is an enlarged view of a section C in FIG. 1.

The gap between the facing portions of the first roll 40 and second roll 50 allows the negative electrode sheet 100 including the negative mixture layer 120 on the first surface 110b of the current collecting foil 110 to pass through. This gap between the facing portions of the first roll 40 and second roll 50 is designed with a dimension smaller than the thickness of the negative electrode sheet 100 before reaching the gap between the facing portions of the first roll 40 and second roll 50. Therefore, when the negative electrode sheet 100 in which the binder particles 122 contained in the negative mixture layer 120 have been softened or melted by heating of the second roll 50 passes through the gap between the facing portions of the first roll 40 and the second roll 50, the negative electrode sheet 100 is roll-pressed in a thickness direction DT by the first roll 40 and the second roll 50 (see FIG. 5). FIG. 5 is an enlarged view of a section C in FIG. 1.

Figure 7:
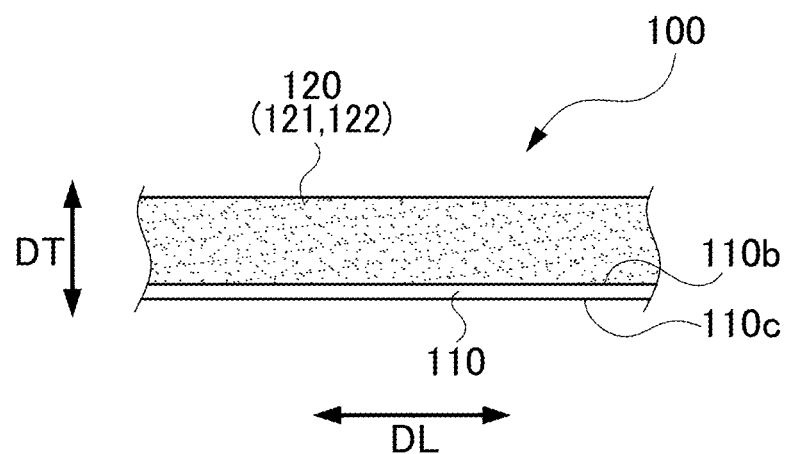
FIG. 7 is a side view of the electrode sheet after subjected to a roll-pressing process.

Accordingly, the negative mixture layer 120 is compressed in the thickness direction DT and meanwhile, through the softened or melted binder particles 122, the active material particles 121 are bonded to each other and also the negative mixture layer 120 is bonded to the surface (the first surface 110b) of the current collecting foil 110 (see FIG. 7). In the first embodiment, the negative electrode sheet 100 is roll-pressed by the first roll 40 and the second roll 50 by placing the outer surface 120b of the negative mixture layer 120 in contact with the outer peripheral surface 40b of the first roll 40. This process is a roll-pressing process (one example of the roll-pressing in the present disclosure) which will be described later.

A method for producing the negative electrode sheet 100 in the first embodiment will be described in detail below. In the pre-press heating process, the negative electrode sheet 100 including the current collecting foil 110 and the negative mixture layer 120 is heated to soften or melt the binder particles 122 contained in the negative electrode sheet 100. To be specific, as described above, the negative electrode sheet 100 is heated when being fed by the fixed distance D1 along the outer peripheral surface 50b of the second roll 50 while remaining contact with the outer peripheral surface 50b of the second roll 50, thereby softening or melting the binder particles 122 contained in the negative mixture layer 120.

The negative mixture layer 120 of the negative electrode sheet 100 to be supplied to the pre-press heating process is a layer made of the plurality of composite particles 123 deposited on the first surface 110b of the current collecting foil 110e without containing any solvent (liquid) (see FIG. 2). In other words, the negative mixture layer 120 is a layer composed of the composite particles 123. In the pre-press heating process, accordingly, the binder particles 122 constituting the composite particles 123, that is, the binder particles 122 bonding to the surface of the active material particles 121, are softened or melted.

In the production method in the first embodiment, as described above, the pre-press heating process is performed by use of the second roll 50 to be used in the subsequent roll-pressing process. This configuration makes it possible to reduce the cost for a production apparatus and hence the production cost as compared with a configuration needing an additional heating device for the pre-press heating process separately from the second roll 50.

In the following roll-pressing process, the negative electrode sheet 100 having been heated in the pre-press heating process is roll-pressed by the first roll 40 and the second roll 50 in such a way that the outer surface 120b of the negative mixture layer 120 contacts with the outer peripheral surface 40b of the first roll 40. Accordingly, the negative mixture layer 120 is compressed in the thickness direction DT, so that the active material particles 121 are bonded to each other and also the negative mixture layer 120 is bonded to the surface (the first surface 110b) of the current collecting foil 110 through the softened or melted binder particles 122 (see FIG. 7).

In the first embodiment, by the way, the temperature of the outer peripheral surface 40b of the first roll 40 is set lower than the temperature of the outer peripheral surface 50b of the second roll 50. Therefore, in the first embodiment, while the temperature of the outer peripheral surface 40b of the first roll 40 to which the outer surface 120b of the negative mixture layer 120 contacts is lower than the temperature of the outer peripheral surface 50b of the second roll 50, the negative electrode sheet 100 is roll-pressed between the outer peripheral surface 40b of the first roll 40 and the outer peripheral surface 50b of the second roll 50.

Accordingly, the adhesive strength (sticking strength) of the binder particles 122 in the negative mixture layer 120 to the first roll 40 is reduced lower than the adhesive strength (sticking strength) of the same to the current collecting foil 110. In other words, of the binder particles 122 in the negative mixture layer 120, the adhesive strength of the binder particles 122 contacting the first roll 40 is made lower than the adhesive strength of the binder particles 122 contacting the current collecting foil 110.

With this configuration, when the outer surface 120b of the negative mixture layer 120 is about to separate from the outer peripheral surface 40b of the first roll 40 after the roll-pressing, the binder particles 122 having contacted with the outer peripheral surface 40b of the first roll 40 are easily separated from the outer peripheral surface 40b of the first roll 40. Consequently, the production method in the first embodiment can reduce a disadvantage that part of the negative mixture layer 120 is separated (peeled), together with the binder particles 122 having contacted with the outer peripheral surface 40b of the first roll 40, from the surface of the current collecting foil 110 (the first surface 110b) and transferred onto the outer peripheral surface 40b of the first roll 40.

The temperature of the outer peripheral surface 40b of the first roll 40 is set to a temperature at which the binder particles 122 softened or melted in the pre-press heating process is reduced in the adhesive strength. To be specific, in the first embodiment, the temperature of the outer peripheral surface 40b of the first roll 40 is set to a lower temperature (concretely, 80° C.) than the softening temperature (concretely, 130° C.) of the binder particles 122.

Figure 6:
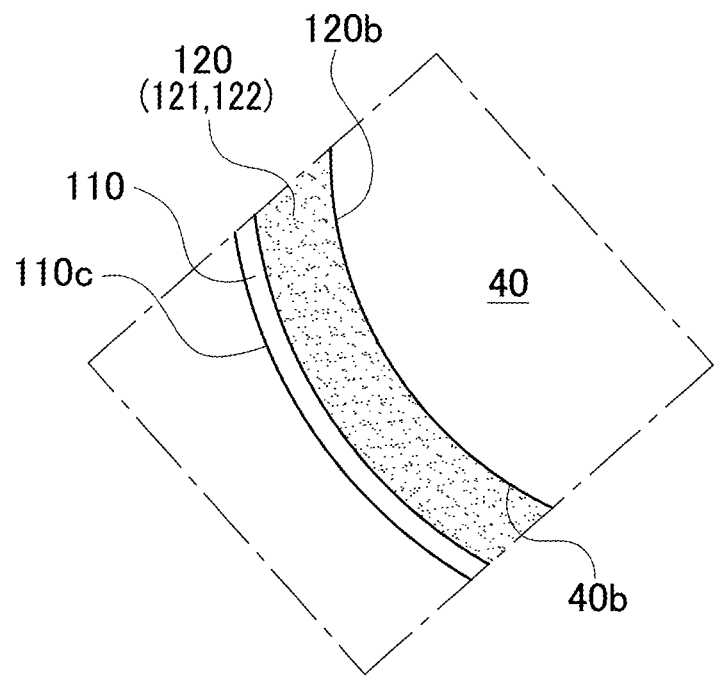
FIG. 6 is an enlarged view of a section D in FIG. 1.

In the production method in the first embodiment, furthermore, the negative electrode sheet 100 is roll-pressed by the first roll 40 and the second roll 50 in the roll-pressing process and then fed by a fixed distance along the outer peripheral surface 40b of the first roll 40 without immediately separating from both the first roll 40 and second roll 50, but immediately separating from only the second roll 50, while keeping the negative mixture layer 120 in contact with the outer peripheral surface 40b of the first roll 40. Thereafter, the negative electrode sheet 100 is separated from the outer peripheral surface 40b of the first roll 40 (see FIGS. 1 and 6). FIG. 6 is an enlarged view of a section D in FIG. 1.

Specifically, the negative electrode sheet 100 having been roll-pressed in passing through the gap between the facing portions of the first roll 40 and the second roll 50 is fed in the form of winding around the outer peripheral surface 40b of the first roll 40 at the winding angle θ2 and further fed in the form of winding around the nip roll 60, so that the negative electrode sheet 100 is separated from the outer peripheral surface 50b of the second roll 50 (see FIG. 1). Therefore, the negative electrode sheet 100, after being roll-pressed by the first roll 40 and the second roll 50, is fed by the fixed distance D2 along the outer peripheral surface 40b of the first roll 40 while the negative electrode sheet 100 is held in contact with the outer peripheral surface 40b of the first roll 40. In the first embodiment, the winding angle θ2 is set to 70°. Thus, the distance D2 is 153 mm, which is calculated as follows:

$$D2 = \text{Diameter of the first roll } 40 \times \pi \times (\theta2/360°) = 250 \text{ mm} \times 3.14 \times (70/360).$$

With the above configuration, the time required for the negative mixture layer 120 to start contacting with the first roll 40 and then separate therefrom (i.e., a contact period) can be elongated. Thus, the adhesive strength of the binder particles 122 contacting with the outer peripheral surface 40b of the first roll 40, i.e., the adhesive strength of the binder particles 122 to the first roll 40, can be further reduced in a period up to separation of the negative mixture layer 120 from the outer peripheral surface 40b of the first roll 40. Accordingly, when the negative mixture layer 120 is about to separate from the outer peripheral surface 40b of the first roll 40, the binder particles 122 having contacted with the outer peripheral surface 40b of the first roll 40 can be easily separated from the outer peripheral surface 40b of the first roll 40. In other words, the binder particles 122 are less likely to be transferred onto the outer peripheral surface 40b of the first roll 40. Consequently, the production method in the first embodiment can further reduce a disadvantage that part of the negative mixture layer 120 is likely to be separated, or peeled, from the first surface 110b of the current collecting foil 110 and thus be transferred onto the outer peripheral surface 40b of the first roll 40.

The negative electrode sheet 100 produced as above is subsequently combined with a positive electrode sheet and separators to make an electrode body. Then, this electrode body is attached with terminal members, and this electrode body and an electrolyte solution are put in a battery case. Thus, a lithium ion secondary battery is accomplished.

Second Embodiment

Figure 8:
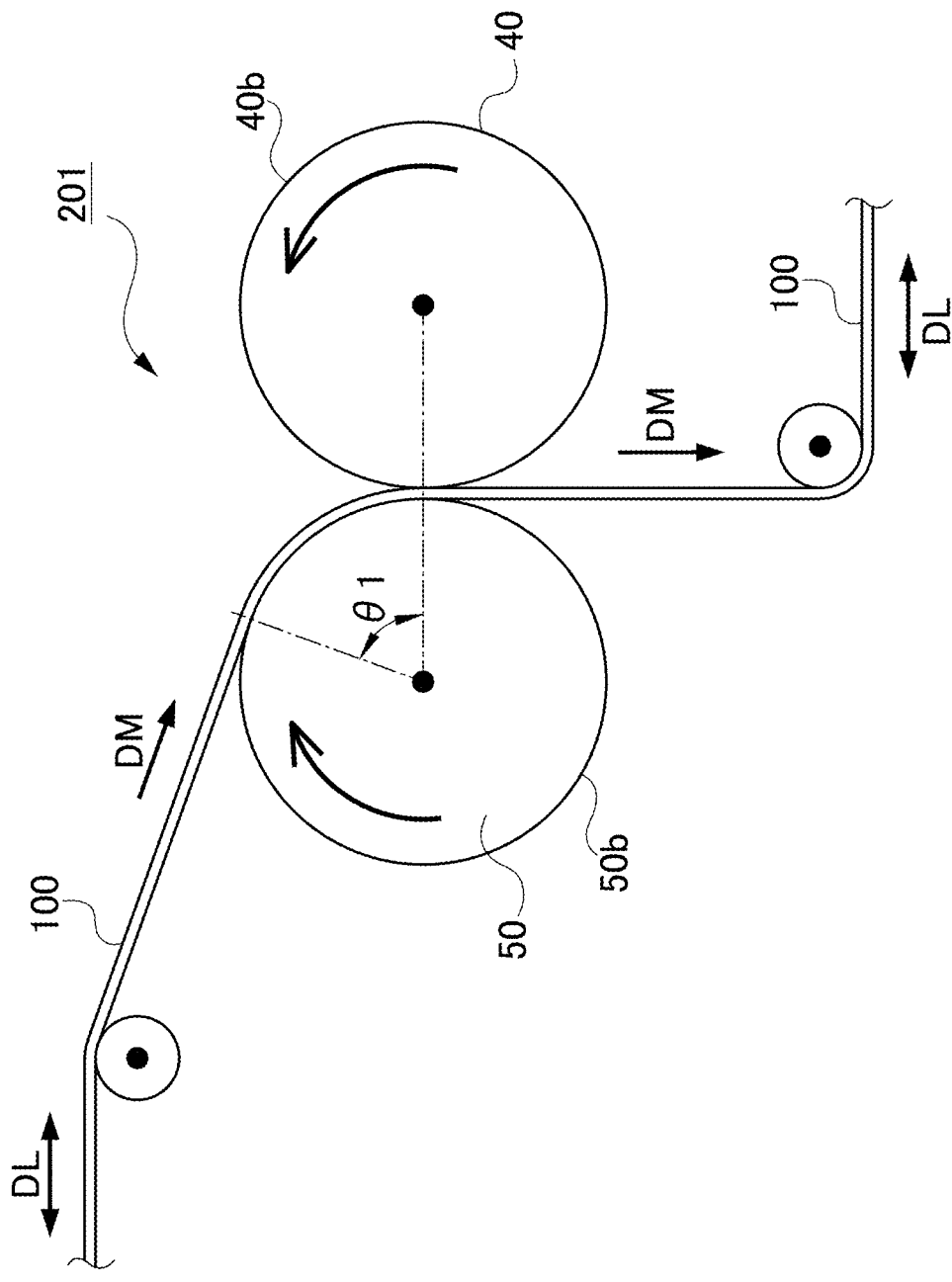
FIG. 8 is a schematic side view of an apparatus for producing an electrode sheet in a second embodiment.

Next, a method for producing an electrode sheet in a second embodiment will be described below. In this second embodiment, the negative electrode sheet 100 is produced by use of an electrode sheet producing apparatus 201. FIG. 8 is a schematic side view of the electrode sheet producing apparatus 201 in the second embodiment. The electrode sheet producing apparatus 201 in the second embodiment differs from the electrode sheet producing apparatus 1 in the first embodiment in that the nip roll 60 is not provided and the negative electrode sheet 100 is immediately separated from the first roll 40 and the second roll 50 after being roll-pressed by the first roll 40 and the second roll 50. Other parts of the apparatus 201 are similar or identical to those of the electrode sheet producing apparatus 1.

In the second embodiment, as with the first embodiment, in the pre-press heating process, the negative electrode sheet 100 including the current collecting foil 110 and the negative mixture layer 120 is heated by being fed by the fixed distance D1 along the outer peripheral surface 50b of the second roll 50 while the negative electrode sheet 100 is held in contact with the outer peripheral surface 50b of the second roll 50, so that the binder particles 122 contained in the negative mixture layer 120 are softened or melted. The temperature of the outer peripheral surface 50b of the second roll 50 is set to 200° C. The winding angle θ1 of the second roll 50 is set to 70° (θ1=70°) (see FIG. 8).

In the following roll-pressing process, as in the first embodiment, the negative electrode sheet 100 heated in the pre-press heating process is roll-pressed by the first roll 40 and the second roll 50 in the form of bringing the outer surface 120b of the negative mixture layer 120 into contact with the outer peripheral surface 40b of the first roll 40. Accordingly, while the negative mixture layer 120 is compressed in its thickness direction DT, the active material particles 121 are bonded to each other through the softened or melted binder particles 122 and also the negative mixture layer 120 is bonded to the first surface 110b of the current collecting foil 110 through the softened or melted binder particles 122 (see FIG. 7).

In the second embodiment, as with the first embodiment, the temperature of the outer peripheral surface 40b of the first roll 40 is set lower than the temperature of the outer peripheral surface 50b of the second roll 50. In particular, the temperature of the outer peripheral surface 40b of the first roll 40 is set to 80° C. In the roll-pressing process, accordingly, the adhesive strength (the sticking strength) of the binder particles 122 in the negative mixture layer 120 to the first roll 40 is reduced lower than the adhesive strength (the sticking strength) of the same to the current collecting foil 110.

With this configuration, when the outer surface 120b of the negative mixture layer 120 is about to separate from the outer peripheral surface 40b of the first roll 40 after the roll-pressing, the binder particles 122 having contacted with the outer peripheral surface 40b of the first roll 40 are easily separated from the outer peripheral surface 40b of the first roll 40. The production method in the second embodiment can also reduce a disadvantage that part of the negative mixture layer 120 is separated (peeled), together with the binder particles 122 having contacted with the outer peripheral surface 40b of the first roll 40, from the surface of the current collecting foil 110 (the first surface 110b) and transferred onto the outer peripheral surface 40b of the first roll 40.

First Comparative Embodiment

Figure 12:
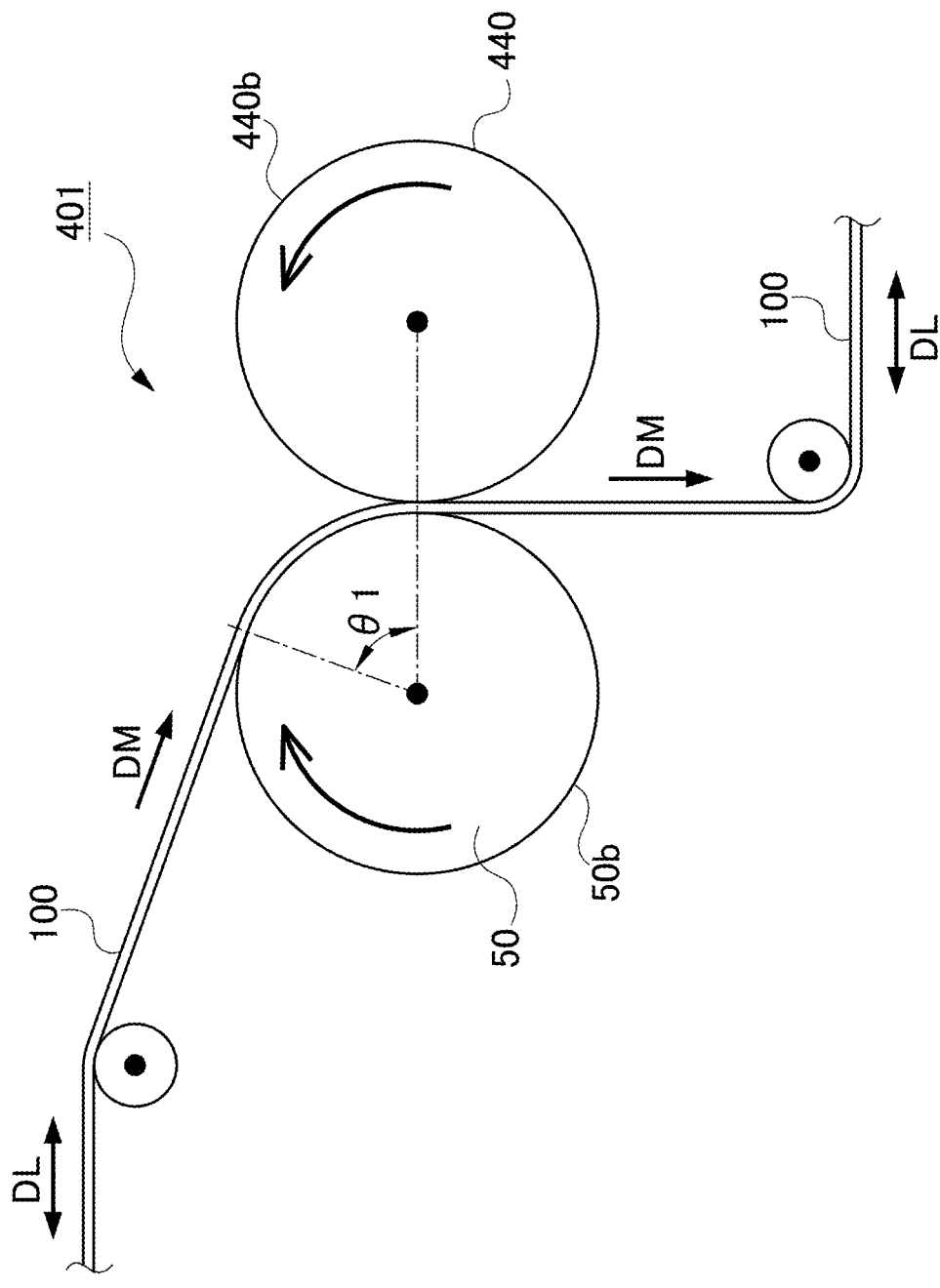
FIG. 12 is a schematic side view of an apparatus for producing an electrode sheet in a first comparative embodiment.

A method for producing an electrode sheet in a first comparative embodiment will be described below. In this first comparative embodiment, the negative electrode sheet 100 is produced by use of an electrode sheet producing apparatus 401. FIG. 12 is a schematic side view of the electrode sheet producing apparatus 401 in the first comparative embodiment. The electrode sheet producing apparatus 401 in the first comparative embodiment differs in the temperature of an outer peripheral surface 440b of a first roll 440 from the electrode sheet producing apparatus 201 in the second embodiment. Other parts of the apparatus 401 are similar or identical to those in the electrode sheet producing apparatus 1.

In the first comparative embodiment, as with the first and second embodiments, in the pre-press heating process, the negative electrode sheet 100 including the current collecting foil 110 and the negative mixture layer 120 is heated by being fed by the fixed distance D1 along the outer peripheral surface 50b of the second roll 50 while the negative electrode sheet 100 is held in contact with the outer peripheral surface 50b of the second roll 50, so that the binder particles 122 contained in the negative mixture layer 120 are softened or melted. The temperature of the outer peripheral surface 50b of the second roll 50 is set to 200° C. The winding angle θ1 is set to 70° (θ1=70°) (see FIG. 12).

In the following roll-pressing process, as in the first and second embodiments, the negative electrode sheet 100 heated in the pre-press heating process is roll-pressed by the first roll 40 and second roll 50 in the form of bringing the outer surface 120b of the negative mixture layer 120 into contact with the outer peripheral surface 40b of the first roll 40. Accordingly, while the negative mixture layer 120 is compressed in its thickness direction DT, the active material particles 121 are bonded to each other and also the negative mixture layer 120 is bonded to the first surface 110b of the current collecting foil 110 through the softened or melted binder particles 122 (see FIG. 7).

In the first comparative embodiment, however, the temperature of the outer peripheral surface 440b of the first roll 440 is set to 200° equal to the temperature of the outer peripheral surface 50b of the second roll 50. Specifically, the temperature of the outer peripheral surface 440b of the first roll 440 with which the negative mixture layer 120 contacts in the roll-pressing process is set higher than the melting point (160° C.) of the binder particles 122 contained in the negative mixture layer 120. The roll-pressing process is performed in this way to produce the negative electrode sheet 100.

Evaluation of the Production Methods

Figure 13:
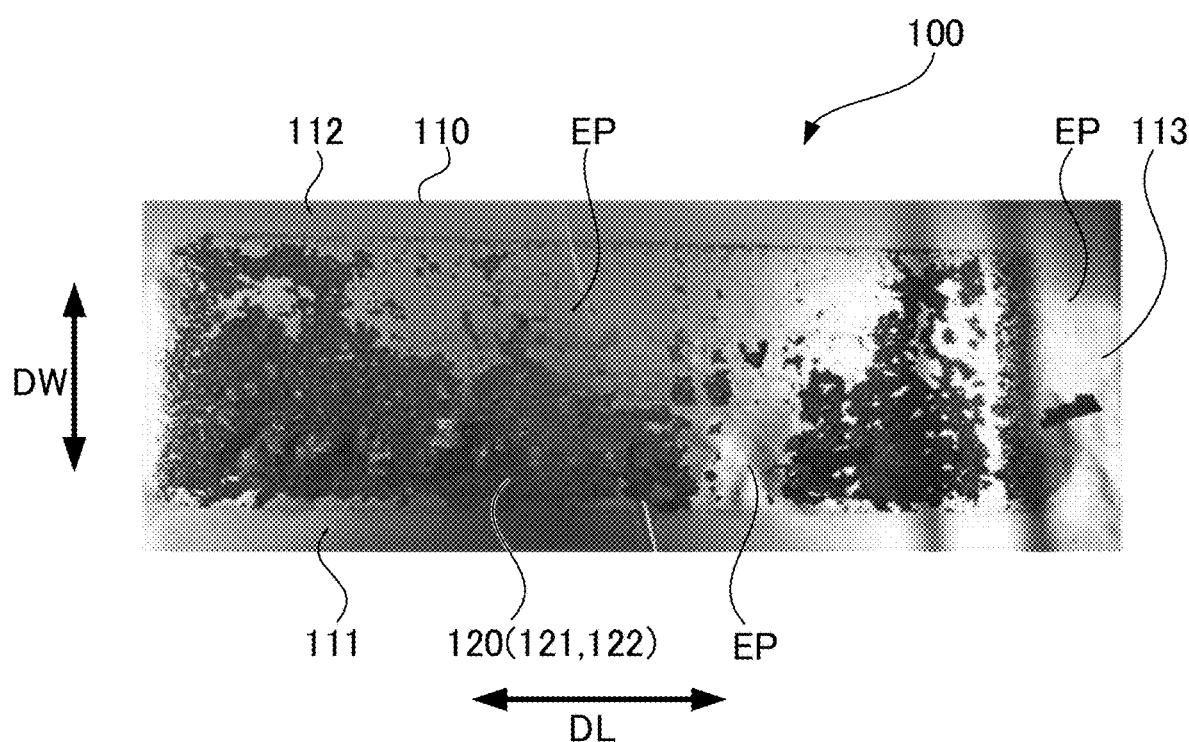
FIG. 13 is a planar photograph of an electrode sheet produced by a production method in the first comparative embodiment.

FIG. 13 is a planar photograph of the negative electrode sheet 100 produced by the production method in the first comparative embodiment. As shown in FIG. 13, in the negative electrode sheet 100 in the first comparative embodiment, the negative mixture layer 120 includes many portions detached, referred to as detached portions EP, over a wide range, from the surface of the intermediate part 113 of the current collecting foil 110, i.e., from the first surface 110b. Thus, a large number of active material particles 121 constituting the negative mixture layer 120 have been detached from the current collecting foil 110. In the production method in the first comparative embodiment, specifically, the negative mixture layer 120 was mostly detached, or peeled, from the first surface 110b of the current collecting foil 110 and transferred onto the outer peripheral surface 40b of the first roll 40.

Figure 9:
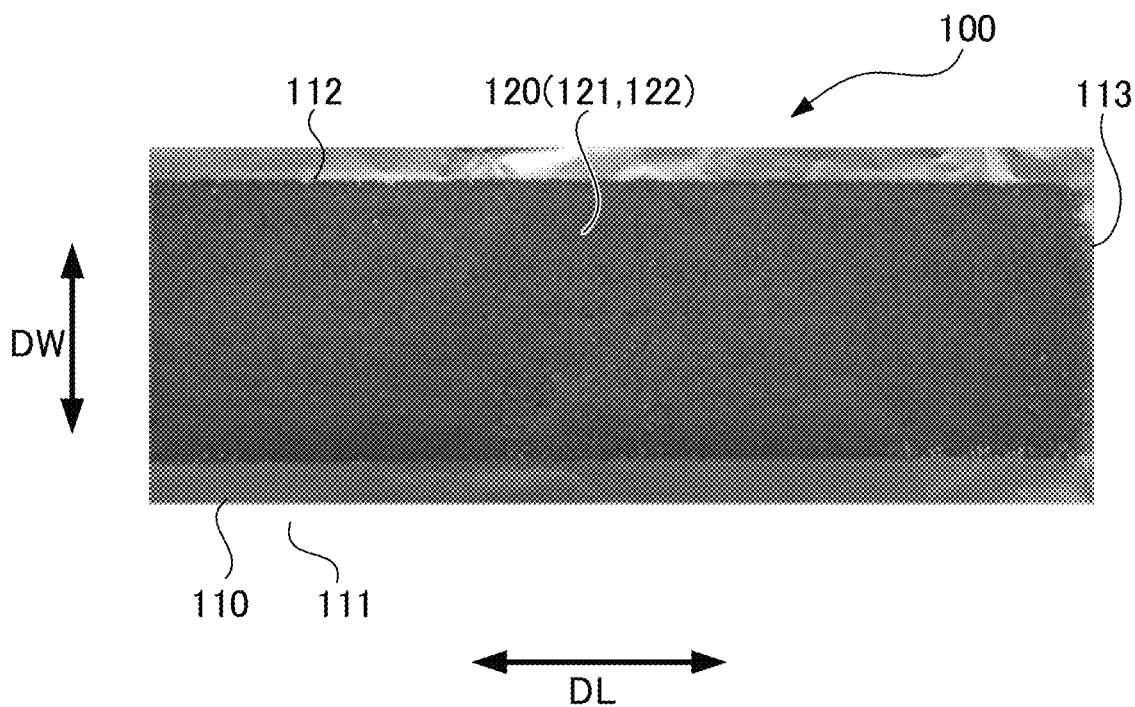
FIG. 9 is a planar photograph of an electrode sheet produced by the production method in the first embodiment.

FIG. 9 is a planar photograph of the negative electrode sheet 100 produced by the production method in the first embodiment. As shown in FIG. 9, in the negative electrode sheet 100 in the first embodiment, the negative mixture layer 120 includes no portions detached from the surface of the intermediate part 113 of the current collecting foil 110, i.e., from the first surface 110b. In the production method in the first embodiment, specifically, any part of the negative mixture layer 120 was not detached, or peeled, from the first surface 110b of the current collecting foil 110 and transferred onto the outer peripheral surface 40b of the first roll 40.

Figure 10:
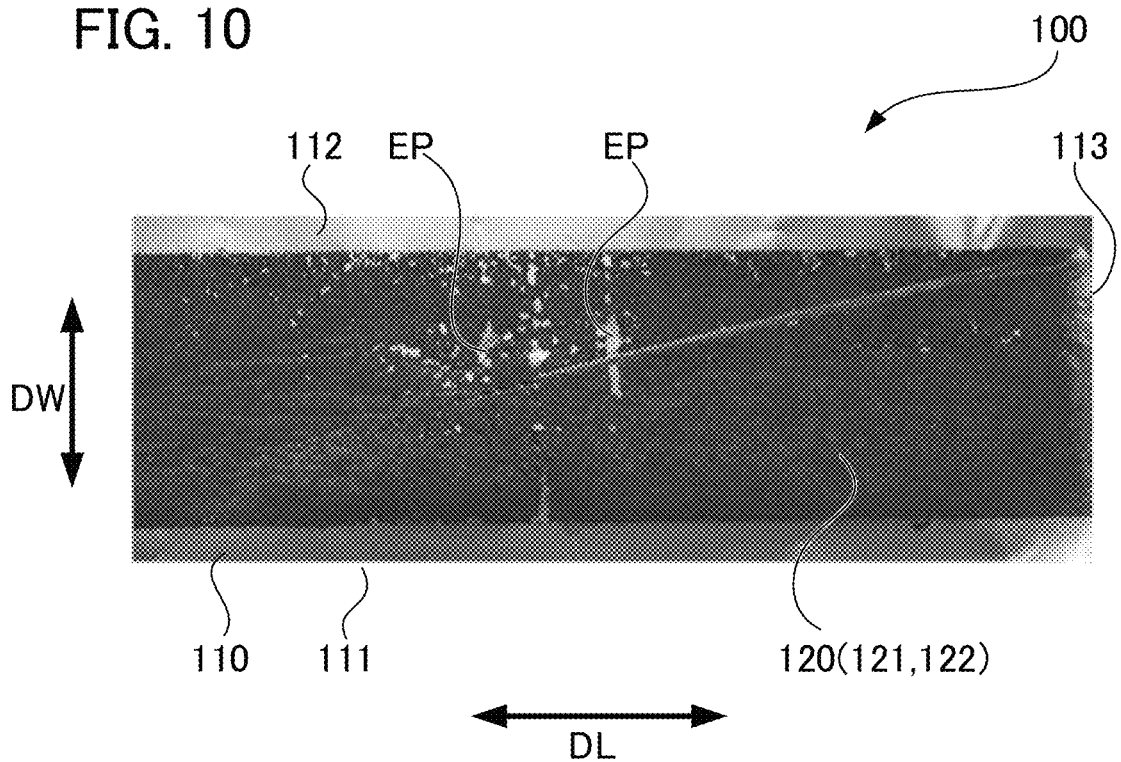
FIG. 10 is a planar photograph of an electrode sheet produced by the production method in the second embodiment.

FIG. 10 is a planar photograph of the negative electrode sheet 100 produced by the production method in the second embodiment. As shown in FIG. 10, in the negative electrode sheet 100 in the second embodiment, the negative mixture layer 120 includes some portions detached, referred to as detached portions EP, from the surface of the intermediate part 113 of the current collecting foil 110, i.e., from the first surface 110b. However, the amount of the active material particles 121 detached from the current collecting foil 110 is extremely small as compared with that in the first comparative embodiment.

According to the production methods in the first and second embodiments, as described above, it is possible to reduce a disadvantage that the negative mixture layer 120 is partly detached or peeled from the first surface 110b of the current collecting foil 110 and transferred onto the outer peripheral surface 40b of the first roll 40, as compared with the production method in the first comparative embodiment. Furthermore, it is found from comparison between the production method in the first embodiment and the production method in the second embodiment that the production method in the first embodiment can more greatly reduce the generation of the detached portion(s) EP. Thus, the negative electrode sheet 100 is fed by the fixed distance along the outer peripheral surface 40b of the first roll 40 after the roll-pressing process while maintaining the negative mixture layer 120 in contact with the outer peripheral surface 40b of the first roll 40, and then the negative electrode sheet 100 is separated from the outer peripheral surface 40b of the first roll 40, so that the negative mixture layer 120 can be prevented from becoming partly detached or peeled from the first surface 110b of the current collecting foil 110 and transferred onto the outer peripheral surface 40b of the first roll 40.

The present disclosure is described in the first and second embodiments, but is not limited thereto. The present disclosure may be embodied in other specific forms without departing from the essential characteristics thereof.

For instance, the first and second embodiments each exemplify the production method of the negative electrode sheet 100 as the method for producing an electrode sheet. However, the present disclosure is also applicable to a method for producing a positive electrode sheet as well as the negative electrode sheet. For producing the positive electrode sheet, the composite particles used therein may be composite particles made of active material particles having binder particles and conductive particles that bond to the surface of each active material particle. These composite particles can be prepared in a manner for example that active material particles (e.g., nickel cobalt lithium manganese oxide particles), binder particles (e.g., PVDF particles), and conductive particles (e.g., acetylene black particles) are mixed at a ratio by weight of 90:5:5.

The first and second embodiments only show the example that the negative mixture layer 120 is formed on only one surface (the first surface 110b) of the current collecting foil 110. As an alternative, the negative mixture layer 120 may be formed on both surfaces of the current collecting foil 110, i.e., on the first surface 110b and the second surface 110c. Specifically, the present disclosure can be applied to a method for producing not only the electrode sheet including an electrode mixture layer on one surface (the first surface) of the current collecting foil but also an electrode sheet including an electrode mixture layer on each surface of a current collecting foil, i.e., on both the first surface and the second surface thereof. To form the negative mixture layer 120 on each surface of the current collecting foil 110, the production method may be configured to perform the pre-press heating process and the roll-pressing process on the negative electrode sheet 100 including the negative mixture layer 120 on the first surface 110b of the current collecting foil 110 as described above and then provide a negative mixture layer 120 made of composite particles 123 on the second surface 110c of the current collecting foil 110 of the same negative electrode sheet 100, and further perform the pre-press heating process and the roll-pressing process on this negative electrode sheet 100.

Figure 11:
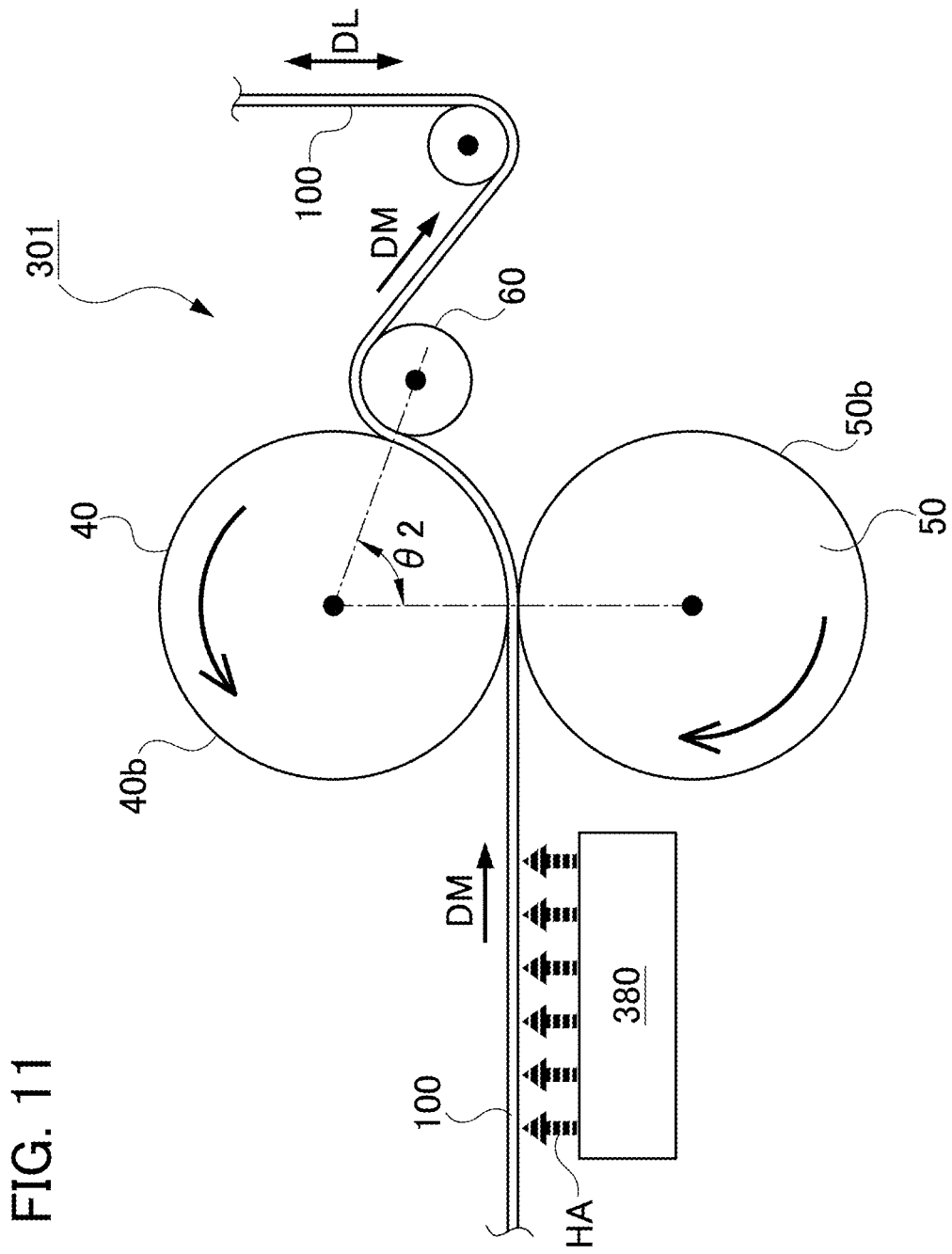
FIG. 11 is a schematic side view of an apparatus for producing an electrode sheet in a first modified embodiment.

In the first and second embodiments, the pre-press heating is performed by use of the second roll 50. As an alternative, the pre-press heating may be performed by use of any other devices as long as it can soften or melt binder particles contained in an electrode sheet prior to the roll-pressing process. For example, FIG. 11 shows an electrode sheet producing apparatus 301 in a first modified embodiment. In this apparatus 301, a heater 380 for blowing hot air HA is placed upstream of the first roll 40 and the second roll 50 in the feeding direction DM to blow the hot air HA against the negative electrode sheet 100 in order to soften or melt the binder particles 122 contained in the negative electrode sheet 100.

REFERENCE SIGNS LIST 1, 201, 301 Electrode sheet producing apparatus
40 First roll
40b Outer peripheral surface
50 Second roll
50b Outer peripheral surface
100 Negative electrode sheet (Electrode sheet)
110 Current collecting foil
110b First surface (Surface)
120 Negative mixture layer (Electrode mixture layer)
120b Outer surface
121 Active material particles
122 Binder particles
123 Composite particles
DL Length direction
DM Feeding direction
DT Thickness direction
DW Width direction

What is claimed is:

1. A method of producing an electrode sheet including a current collecting foil having a surface on which an electrode mixture layer is provided, the method comprising:
heating, before pressing, the electrode sheet including the current collecting foil and the electrode mixture layer formed of composite particles composed of active material particles and binder particles to soften or melt the binder particles contained in the electrode mixture layer, in which each of the binder particles has a smaller diameter than each of the active material particles so that a plurality of the binder particles bind to a surface of each of the active material particles; and
roll-pressing the heated electrode sheet in the heating between a first roll and a second roll to compress the electrode mixture layer in a thickness direction, so that the active material particles are bonded to each other and the electrode mixture layer is bonded to the surface of the current collecting foil through the softened or melted binder particles,
wherein
the roll-pressing includes pressing the electrode sheet by setting a temperature of an outer peripheral surface of the first roll with which an outer surface of the electrode mixture layer of the electrode sheet contacts lower than a softening temperature of the binder particles to reduce an adhesive strength of the binder particles in the electrode mixture layer to the first roll to be lower than an adhesive strength of the binder particles to the current collecting foil, and
the method further comprises, after the electrode sheet is roll-pressed in the roll-pressing, feeding the electrode sheet by a fixed distance along the outer peripheral surface of the first roll while maintaining the outer surface of the electrode mixture layer in contact with the outer peripheral surface of the first roll, and then separating the electrode sheet from the outer peripheral surface of the first roll, and
the fixed distance by which the electrode sheet is fed along the outer peripheral surface of the first roll is determined based on an acute angle at which the electrode sheet is wound around the outer peripheral surface of the first roll from a point where the electrode sheet contacts the outer peripheral surface of the first roll to a point where the electrode sheet separates from the outer peripheral surface of the first roll.

2. A method of producing an electrode sheet including a current collecting foil having a surface on which an electrode mixture layer is provided, the method comprising:
heating, before pressing, the electrode sheet including the current collecting foil and the electrode mixture layer formed of composite particles composed of active material particles and binder particles to soften or melt the binder particles contained in the electrode mixture layer, in which each of the binder particles has a smaller diameter than each of the active material particles so that a plurality of the binder particles bind to a surface of each of the active material particles; and
roll-pressing the heated electrode sheet in the heating between a first roll and a second roll to compress the electrode mixture layer in a thickness direction, so that the active material particles are bonded to each other and the electrode mixture layer is bonded to the surface of the current collecting foil through the softened or melted binder particles,
wherein the roll-pressing includes pressing the electrode sheet by setting a temperature of an outer peripheral surface of the first roll with which an outer surface of the electrode mixture layer of the electrode sheet contacts lower than a softening temperature of the binder particles to reduce an adhesive strength of the binder particles in the electrode mixture layer to the first roll to be lower than an adhesive strength of the binder particles to the current collecting foil, and wherein the heating before pressing includes, prior to said roll-pressing the electrode sheet between the first roll and the second roll, feeding the electrode sheet by a further fixed distance in a rotation direction of the second roll while holding the current collecting foil of the electrode sheet in direct contact with an outer peripheral surface of the second roll having a temperature higher than the softening temperature of the binder particles, to soften or melt the binder particles contained in the electrode mixture layer.

3. The method according to claim 1, wherein the heating before pressing includes, prior to said roll-pressing the electrode sheet between the first roll and the second roll, feeding the electrode sheet by a further fixed distance in a rotation direction of the second roll while holding the current collecting foil of the electrode sheet in direct contact with an outer peripheral surface of the second roll having a temperature higher than the softening temperature of the binder particles, to soften or melt the binder particles contained in the electrode mixture layer.

4. The method according to claim 1, wherein in the roll-pressing, the temperature of the outer peripheral surface of the first roll with which the outer surface of the electrode mixture layer of the electrode sheet contacts is set lower than a temperature of an outer peripheral surface of the second roll.

5. The method according to claim 1, wherein
the heating before pressing includes, before the electrode sheet is roll-pressed in the roll-pressing, feeding the electrode sheet by a further fixed distance in a rotation direction of the second roll while holding the electrode sheet in contact with an outer peripheral surface of the second roll.

6. A method of producing an electrode sheet including a current collecting foil having a surface on which an electrode mixture layer is provided, the method comprising:
heating, before pressing, the electrode sheet including the current collecting foil and the electrode mixture layer formed of composite particles composed of active material particles and binder particles to soften or melt the binder particles contained in the electrode mixture layer, in which each of the binder particles has a smaller diameter than each of the active material particles so that a plurality of the binder particles bind to a surface of each of the active material particles; and
roll-pressing the heated electrode sheet in the heating between a first roll and a second roll to compress the electrode mixture layer in a thickness direction, so that the active material particles are bonded to each other and the electrode mixture layer is bonded to the surface of the current collecting foil through the softened or melted binder particles,
wherein
the roll-pressing includes pressing the electrode sheet by setting a temperature of an outer peripheral surface of the first roll with which an outer surface of the electrode mixture layer of the electrode sheet contacts lower than a softening temperature of the binder particles to reduce an adhesive strength of the binder particles in the electrode mixture layer to the first roll to be lower than an adhesive strength of the binder particles to the current collecting foil,
the method further comprises, after the electrode sheet is roll-pressed in the roll-pressing, feeding the electrode sheet by a fixed distance along the outer peripheral surface of the first roll while maintaining the outer surface of the electrode mixture layer in contact with the outer peripheral surface of the first roll, and then separating the electrode sheet from the outer peripheral surface of the first roll, the heating before pressing includes, before the electrode sheet is roll-pressed in the roll pressing, feeding the electrode sheet by a further fixed distance in a rotation direction of the second roll while holding the electrode sheet in contact with an outer peripheral surface of the second roll, the further fixed distance is determined based on an acute angle at which the electrode sheet is wound around the outer peripheral surface of the second roll from a first point where the electrode sheet contacts the outer peripheral surface of the second roll to a second point where the electrode sheet contacts the outer peripheral surface of the first roll, and the fixed distance by which the electrode sheet is fed along the outer peripheral surface of the first roll is determined based on an acute angle at which the electrode sheet is wound around the outer peripheral surface of the first roll from the second point where the electrode sheet contacts the outer peripheral surface of the first roll to a third point where the electrode sheet separates from the outer peripheral surface of the first roll.

7. The method according to claim 6, wherein the further fixed distance is calculated as follows:
the further fixed distance=a diameter of the second roll×$\pi$×($\theta 1/360°$), where $\theta 1$ is the acute angle at which the electrode sheet is wound around the outer peripheral surface of the second roll from the first point where the electrode sheet contacts the outer peripheral surface of the second roll to the second point where the electrode sheet contacts the outer peripheral surface of the first roll.

8. The method according to claim 6, wherein the fixed distance is calculated as follows:
the fixed distance=a diameter of the first roll×$\pi$×($\theta 2/360°$), where $\theta 2$ is the acute angle at which the electrode sheet is wound around the outer peripheral surface of the first roll from the second point where the electrode sheet contacts the outer peripheral surface of the first roll to the third point where the electrode sheet separates from the outer peripheral surface of the first roll.

9. The method according to claim 8, wherein the further fixed distance is calculated as follows:
the further fixed distance=a diameter of the second roll×$\pi$×($\theta 1/360°$), where $\theta 1$ is the acute angle at which the electrode sheet is wound around the outer peripheral surface of the second roll from the first point where the electrode sheet contacts the outer peripheral surface of the second roll to the second point where the electrode sheet contacts the outer peripheral surface of the first roll.

* * * * *